(12) United States Patent
Green (10) Patent No.: US 6,247,168 B1
(45) Date of Patent: *Jun. 12, 2001

(54) EMBEDDED NON-VOLATILE PROGRAMMING TOOL

(75) Inventor: Alex D. Green, Cleveland Heights, OH (US)

(73) Assignee: Rockwell Technologies, LLC, Thousand Oaks, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/841,232

(22) Filed: Apr. 29, 1997

(51) Int. Cl.[7] ............................................ G06F 9/45
(52) U.S. Cl. ................................. 717/1; 717/2; 717/11; 700/17; 700/18
(58) Field of Search ................................. 395/701, 712; 717/1, 2, 11; 700/17, 16; 714/39, 47

(56) References Cited

U.S. PATENT DOCUMENTS

| | | | |
|---|---|---|---|
| 4,858,101 | * 8/1989 | Stewart et al. | 364/131 |
| 4,882,702 | * 11/1989 | Struger et al. | 710/2 |
| 5,162,986 | * 11/1992 | Graber et al. | 703/17 |
| 5,168,441 | * 12/1992 | Onarheim et al. | 364/146 |
| 5,193,189 | * 3/1993 | Flood et al. | 709/103 |
| 5,212,631 | * 5/1993 | Schmidt et al. | 700/18 |
| 5,274,767 | * 12/1993 | Maskovyak | 710/16 |
| 5,295,005 | * 11/1993 | Schmidt et al. | 700/18 |
| 5,295,059 | * 3/1994 | Brooks et al. | 700/18 |
| 5,421,017 | * 5/1995 | Scholz et al. | 395/712 |
| 5,428,526 | * 6/1995 | Flood et al. | 700/16 |
| 5,623,604 | * 4/1997 | Russell et al. | 395/712 |
| 5,754,785 | * 5/1998 | Lysik et al. | 709/222 |
| 6,055,632 | * 4/2000 | Deegan et al. | 709/321 |

* cited by examiner

Primary Examiner—Kakali Chaki
Assistant Examiner—Chameli C. Das
(74) Attorney, Agent, or Firm—David G. Luettgen; John J. Horn; A. M. Gerasimow (57) ABSTRACT

A tool for programming non-volatile memory is embedded in the form of an object in a programmable controller module, and can be used to transfer a firmware program to a plurality of different modules connected by a common network. The tool can be placed in any type of module, and can be used to transfer a firmware program to any type of module, regardless whether the two module types are the same or different types. The firmware program is received in a first module from a user interface by way of a communication link, which may be relatively slow. The object is embedded in the first module and has a plurality of services and attributes which are adapted for transferring the firmware program to a plurality of target modules. The first module and the plurality of target modules are connected by way of the common network, which is preferably a high speed network. Thus, the time required to transfer the firmware program to the plurality of target modules is nominal once the firmware program is received in the first module. Advantageously, the present invention provides a system which can rapidly program a plurality of modules having non-volatile memory, which is usable both during production and in the field, and which can program a plurality of different types of modules regardless of the types of communication ports disposed on the fronts of the modules.

17 Claims, 5 Drawing Sheets

EMBEDDED NON-VOLATILE PROGRAMMING TOOL

FIELD OF THE INVENTION

The present invention generally relates to tools for programming non-volatile memory, and more specifically relates to a non-volatile memory programming tool which is embedded in a module of a programmable controller.

DESCRIPTION OF RELATED ART

Programmable controller systems are known for controlling industrial processes. A typical programmable controller system comprises a processor module, for example a PLC® processor module, and a plurality of other programmable controller modules. The other modules could include, for example, one or more Ethernet® modules, DHRIO (Data Highway™ Remote Input/Output) modules, CNB (ControlNet™ Bridge) modules, analog modules, and/or a plurality of other types of modules. (Herein, for convenience, trademarks are designated as such only upon their first occurrence.) The PLC processor module and the plurality of other modules are disposed in a rack and networked by a common backplane.

Programmable controllers are usually programmed using an object-oriented programming language which is formed by a set of objects which model real-world problems. The objects each provide a set of services and each have one or more attributes which define the parameters of the object or the services it provides. The objects interact through a message-based interface which allows them to access each other's services without having to understand each other's internal characteristics. Different objects are implemented in different modules, and the different objects give the modules their unique functionality.

The objects are implemented in the firmware of the PLC processor module and the other modules. The firmware is programmed into the modules during production and is often later updated. According to present methods, the programming of a module during production occurs according to the following two-step process. First, automatic test equipment loads boot code (a small amount of code on the order of 32–64 kilobytes) directly into non-volatile memory (e.g., Flash memory or EEPROM) using specialized in-circuit test equipment.

Second, a non-volatile memory programming tool is then used to load the remainder of the firmware (a large amount of code on the order of 150–500 kilobytes). The boot code loaded during the first step contains enough functionality to program the non-volatile memory with the remainder of the firmware received from the programming tool. The programming tool resides on a personal computer (PC) and connects to an individual module by way of a communication port disposed on the front of the module. The programming tool establishes a connection (e.g., usually a serial connection) with the module, and then downloads the firmware to the module by way of the communication port. For simplicity, it is desired that the same programming tool be usable both for production and for field updates; thus, field updates also occur in accordance with the second part of this process.

This approach suffers at least two drawbacks. First, a separate and unique programming tool is required for each of the different types of modules. Different types of modules have different types of communication ports, depending on the function which the particular type of module is designed to perform. The unique aspects of the different types of communication ports inherently require different hardware and software configurations on the PC for each of the different types of modules.

Second, this approach is very slow. The communication port disposed on the front of most types of modules is a serial port, which is very slow. For example, the programming time for a typical PLC processor module using an RS-232 serial connection is on the order of about twenty minutes. While some modules have an Ethernet connection and thus have lower programming times, these modules are very much in the minority.

Thus, what is needed is a non-volatile memory programming tool which can be used with a plurality of different types of modules, regardless of the type of communication port on the front of the module, and which can program non-volatile memory at high speeds.

SUMMARY OF THE INVENTION

A production object for an object-oriented programming language is disclosed. The production object is disposed in a first module and has a plurality of services and a plurality of attributes which are adapted for transferring a program from the first module to a second module over a common network.

A programmable controller system is also disclosed. The programmable controller system includes a backplane, a first module, and a second module. The first and second modules are disposed in the backplane and are linked by the backplane. The first module is adapted for receiving a firmware program. The first module has a programming tool disposed therein which is adapted for transferring the firmware program from the first module to the second module over the backplane. Preferably, the programming tool is in the form of a production object as described above.

A method of transferring a program to a plurality of target modules is also disclosed. According to the method, a programmable controller system comprising a first module and the plurality of target modules is provided. The programmable controller system is programmable with an object-oriented programming language, and the first module and the plurality of target modules are commonly disposed in a common backplane.

Then, a first allocate request message is sent to a memory object in the first module. The memory object has a plurality of services and a plurality of attributes which are adapted for managing memory of the first module. Responsive to the first allocate request message, the memory object allocates a first memory block in the memory of the first module. A script file is then transferred from a user interface to the first memory block. The script file defines parameters for transferring the firmware program to the plurality of target modules.

Also, a second allocate request message is sent to the memory object in the first module. Responsive to the second allocate request message, the memory object allocates a second memory block in the memory of the first module. Then, a data file is transferred from the user interface to the second memory block. The data file contains the firmware program.

Next, a create request message is sent to a production object. The production object has a plurality of services and a plurality of attributes which are adapted for transferring the firmware program from the first module to the plurality of target modules. The production object is disposed in the first module. The create request message causes a new instance of the production object to be created for transferring the firmware program to the plurality of target modules.

Also, script and data pointer attributes are set. The script and data pointer attributes point to the first and second memory blocks, respectively. The script and data pointer attributes are two of the plurality of attributes of the production object.

Finally, the production object is invoked and the firmware program is transferred from the first module to the plurality of target modules over the common backplane. This transferring step is performed by the production object.

Advantageously, the preferred embodiment of the present invention provides a rapid way of programming modules having non-volatile memory. Unlike current systems, the programming tool is in the form of an embedded object and is located internally and not externally to the programmable controller system. As a result, it is possible to transfer the firmware program to the production object just once (e.g., over a serial link), and then the production object can transfer the firmware program to a virtually unlimited number of target modules over a high-speed network connection. Thus, the amount of time required to program a plurality of modules is drastically reduced. Further, the preferred embodiment of the present invention is usable both during production and in the field. It is not necessary to have two different systems for programming modules depending on when the programming takes place. Moreover, the present invention minimizes the downtime of modules when updating occurs, even when only a single module is updated. Finally, the preferred embodiment of the present invention provides a single tool which can be used to program a plurality of different modules, regardless of the types of communication ports disposed on the fronts of the modules.

Other objects, features, and advantages of the present invention will become apparent to those skilled in the art from the following detailed description and accompanying drawings. It should be understood, however, that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

A preferred exemplary embodiment of the invention is illustrated in the accompanying drawings in which like reference numerals reference like parts throughout, and in which.

DETAILED DESCRIPTION OF THE PREFERRED EMBODIMENT

Figure 1:
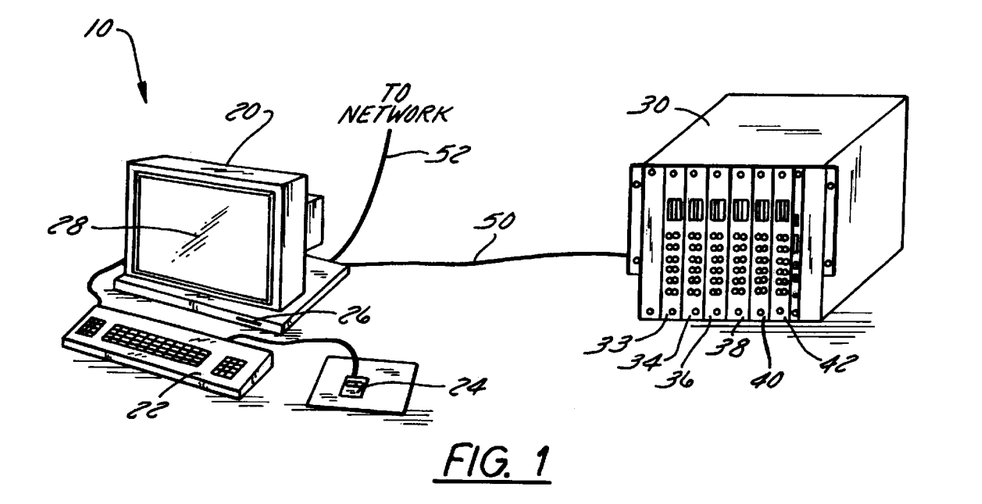
FIG. 1 illustrates a system for programming non-volatile memory in accordance with the present invention.
Figure 2A:
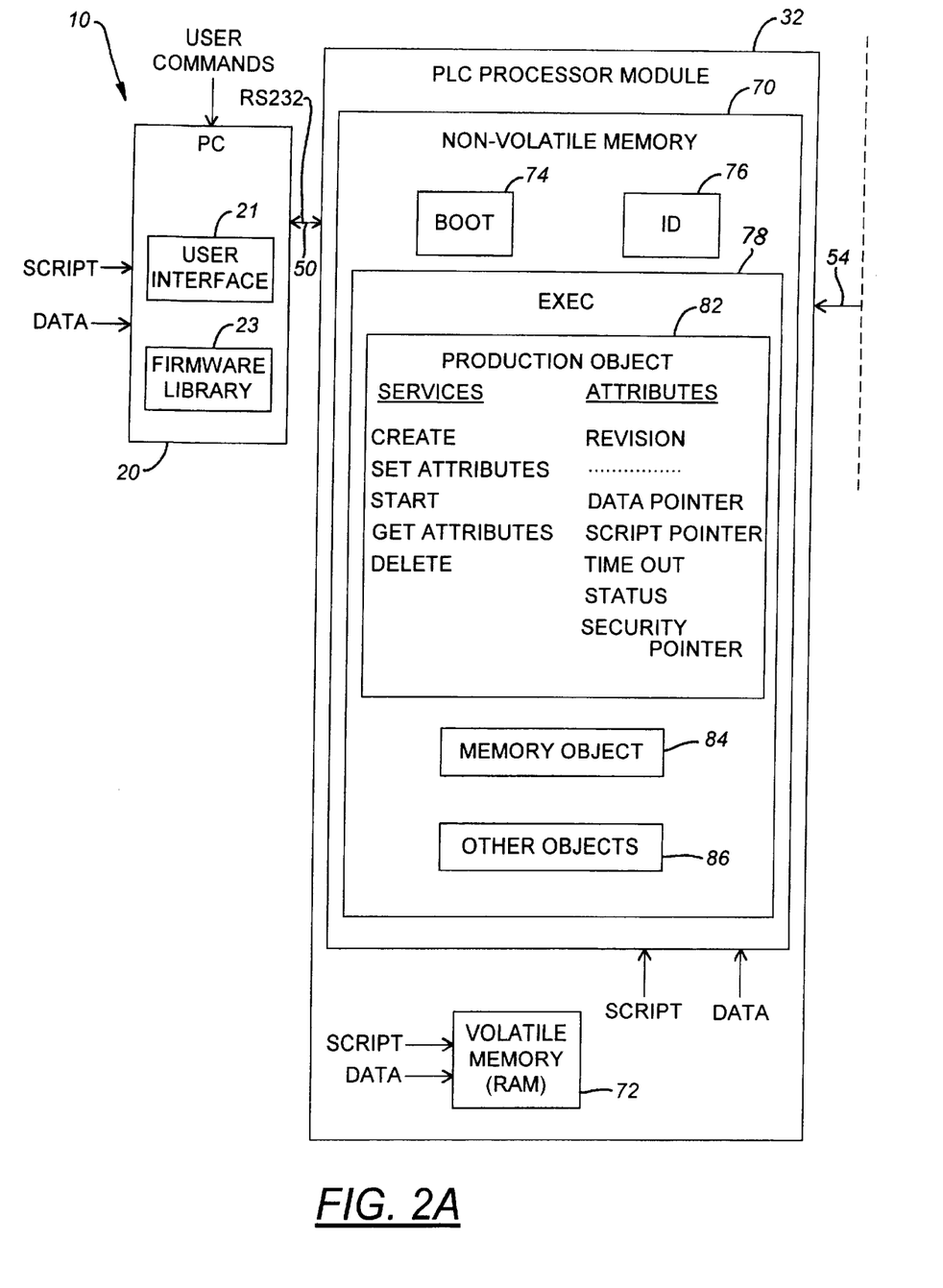
FIGS. 2A–2B illustrate a functional block diagram of a non-volatile memory programming system in accordance with the present invention.
Figure 2B:
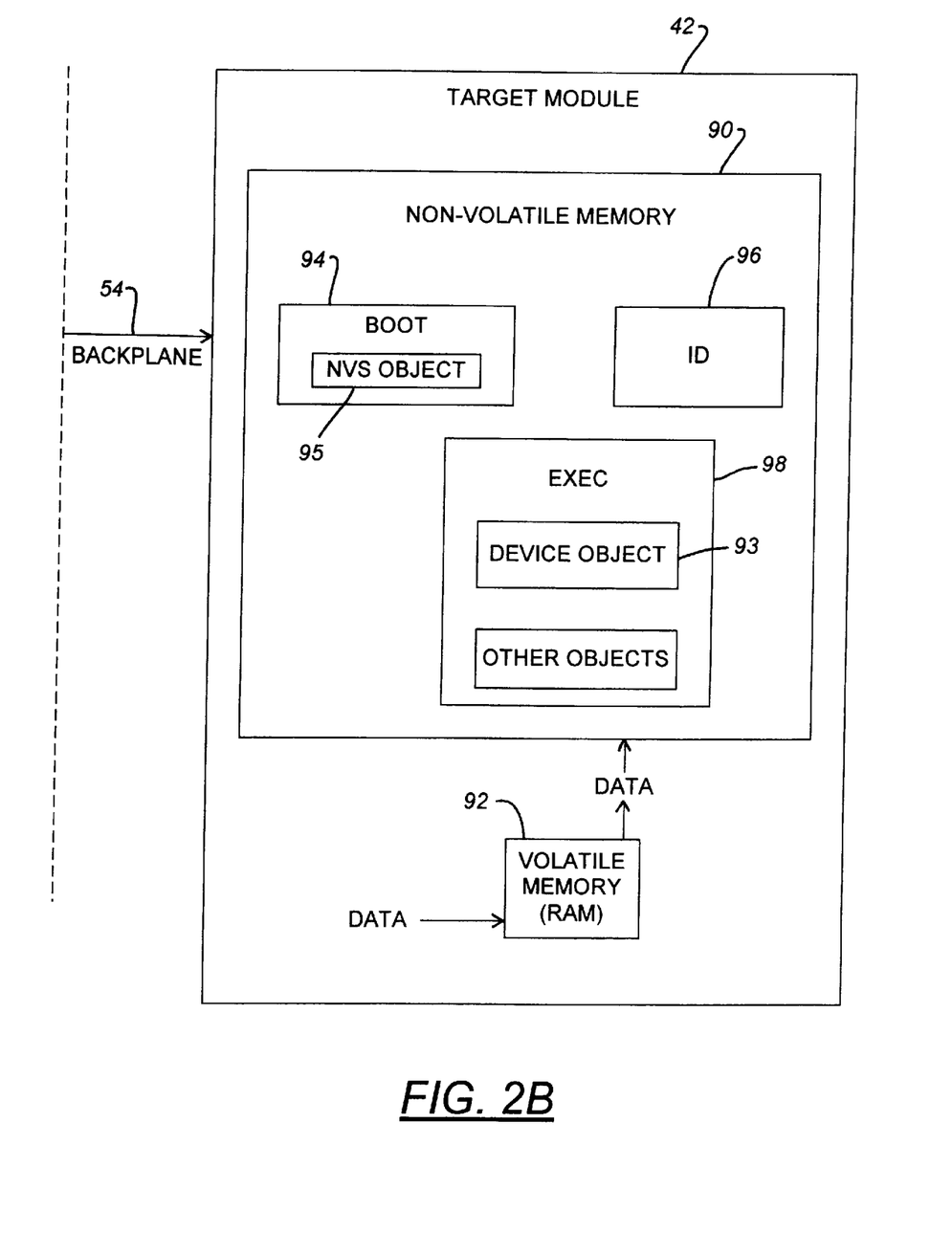

Referring now to FIGS. 1 and 2A–2B, a system 10 for programming non-volatile memory is illustrated. Referring first to FIG. 1, the system comprises a personal computer (PC) 20 connected to a PLC system 30 by way of an RS-232 link 50.

As is conventional, the PC 20 comprises a keyboard 22 and a mouse 24 for accepting user commands, a floppy disk drive 26 for accepting data and other information via floppy disk, and a display 28 for communicating to the user. The PC 20 also comprises a network connection 52 for alternatively accepting data and/or user commands from a network (not illustrated).

The PLC system 30 comprises a PLC processor module 32 and a plurality of other modules 34–42. The other modules 34–42 could include, for example, one or more Ethernet modules, DHRIO modules, CNB modules, analog modules, PLC processor modules and/or a plurality of other types of modules. The modules are disposed in a rack (not illustrated) and are networked by way of a common backplane 54 (see FIG. 2).

At least one of the modules 34–42 is a target module which has been targeted as a module that is to be updated. Whether all of the modules are target modules depends on how the system 10 is being used. If the system 10 is being used to perform field updates, then it may be the case that only one of the modules 34–42 is a target module. On the other hand, if the system 10 is being used for programming the modules during production, then the modules 34–42 would normally all be target modules and would normally all be the same type of module.

In principle, the only difference between programming during production and updating in the field is the number of modules that are programmed or updated. Thus, the terms "programming" and "updating" (and other forms of the same words) are used interchangeably herein. For simplicity, the discussion herein initially focuses on the programming of a single target module 42.

Referring now to FIGS. 2A–2B, a more detailed functional block diagram of the programming system 10 is illustrated. The main functional components of the system 10 are the PC 20 (which provides a user interface and which stores firmware revisions), the PLC processor module 32 (which performs the update) and the target module 42 (which receives the update).

More specifically, the PC 20 also comprises a user interface 21 and a firmware library 23. The user interface 21 performs three basic functions. First, the user interface 21 enables a user to introduce a new firmware revision into the firmware library 23 of the PC 20, e.g., by way of the disk drive 26 or the network connection 52. Each time a new firmware revision is generated, the firmware revision is loaded into the firmware library 23, which then preferably stores the entire set of firmware revisions for each of the different types of modules used by the PLC system 30. Second, the user interface 21 also allows the user to select a firmware revision to be loaded into the target module 42. Normally, the user selects the most recent firmware revision to be loaded into the target module 42. Sometimes, however, the user may wish to enter a previous firmware revision into the target module 42, for example, for purposes of performing testing. Finally, the user interface 21 transfers the selected firmware revision to the PLC processor module 32, which then communicates the firmware revision to the target module 42, as described in greater detail below.

Each firmware revision comprises a data file and a script file. The data file contains the updated firmware, and the script file contains parameters that define how the firmware revision should be performed. The preferred script file format includes the fields illustrated in Table 1. The meanings the fields are also described in Table 1 and are further clarified by the discussion below. It should be understood, of course, that the script file could contain more, less, and/or entirely different fields, depending on the application.

TABLE 1

Exemplary entries of a preferred script file.

| FIELD NAME | MEANING |
|---|---|
| Field Entries Common to all Updates | |
| NumberUpdates | Indicates the number of updates contained in the script file |
| NumberIdentities | Indicates the number of entries in the "Identity N" table (described below) |
| Identity N = [1 . . . n] | Implements a table, each entry in the table lists identification parameters (vendor name, etc.) of a specific product type with which the script file is compatible |
| ConnectionType | Flag which indicates the type of messaging to use when updating a module |
| Field Entries Specific to Each Update | |
| NVS Instance | Indicates the instance number of the object (e.g., boot, executive, libraries, custom routines, adjustable machine parameters) being updated |
| MajorRevision | Indicates the major revision of the instance being updated |
| MinorRevision | Indicates the minor revision of the instance being updated |
| MaxTimeoutSeconds | Indicates the number of seconds to wait for a response from the object being updated before a timeout error is issued |
| StartingLocation | Indicates the starting location in the memory of the target module where the update should be stored |
| FileSize | Indicates the number of bytes in the file to be transferred to the target module |
| DataFileName | Indicates the name in the firmware library of the data file containing the data to be sent to the target module |
| UpdateReset | Flag which indicates whether the target module should be reset at the conclusion of the update |
| AutoResetOnError | Flag which indicates whether the target module should be reset if an error occurs during the update |
| FirstTransferDelay | Indicates the number of seconds to wait after receiving the UPDATE response message before sending the first data transfer |
| ErrorInstructions | Text string containing special instructions to be displayed on the user interface if an error occurs during the update |

It may be noted that the same script file can be used to perform multiple updates to the same target module. As detailed below, the firmware is comprised of multiple instances, and each instance (e.g., boot, ID, executive) constitutes a separate update. If multiple updates are performed, the field entries common to all updates are stated only once in the script file (e.g., at the beginning), whereas the field entries specific to each update are repeated (although with new field values in at least some of the fields) for each additional update performed.

The other two main functional components of the system 10 are the PLC processor module 32 and the target module 42. The PLC processor module 32 and the target module 42 each respectively comprise a non-volatile memory 70 and 90 and a volatile memory 72 and 92. The non-volatile memories 70 and 90 each respectively comprise firmware including boot instances 74 and 94, ID instances 76 and 96, and executive instances 78 and 98. In each case, the boot instance, the ID instance, and the executive instance collectively implement an operating system.

As previously indicated, the boot instance 94, ID instance 96, and executive instance 98 each constitute separate updates. Thus, if each of these instances is updated, then three separate updates are performed (NumberUpdates=3) and the script file contains three sets of the update-specific field entries set forth in Table 1.

Of course, the updates could be performed at any level of granularity. For example, rather than having the entire executive instance 98 correspond to one update, the program which constitutes the executive instance 98 could be broken down into a plurality of firmware programs each constituting their own update. Alternatively, one update could correspond to replacing the entire contents of the non-volatile memory 70.

The executive portions 78 and 98 each comprise a plurality of objects which give the modules 32 and 42 their functionality. The PLC processor module 32 includes a production object 82, a memory object 84 and a plurality of other objects 86. (Note that, while the production object 82 of the illustrated embodiment is located in the PLC processor module 32, there is no inherent reason why this must be the case. The production object 82 could be placed in virtually any type of module.)

The production object 82 performs the non-volatile memory update to the target module 42 based on the script and data files which are loaded into the RAM 72 of the PLC processor module 32. Like other objects in an object-oriented programming language, the production object 82 models a real world problem (i.e., programming memory during production and/or in the field), and provides a plurality of services and has a plurality of attributes which define the characteristics of the production object 82 and the services it provides. The production object preferably has the following services:

CREATE (which creates a new instance of the production object 82),

SET ATTRIBUTE (which sets an attribute of the production object 82),

START (which starts updating the target module 42 by causing the production object 82 to initiate communication with the target module 42 and begin transferring the data file to the target module 42), GET ATTRIBUTE (which gets an attribute of the production object 82), and DELETE (which deletes an instance of the production object 82).

Further, the production object 82 and its services preferably have the following attributes:

REVISION (which identifies the revision of the production object 82),

DATA POINTER (which points to the data file in the RAM 72),

SCRIPT POINTER (which points to the script file in the RAM 72),

STATUS (which indicates the status of the production object 82), and

TIME-OUT (which defines the maximum allowable time for the STATUS attribute to return to idle before a time-out error is issued).

Of course, the services and attributes could be renamed while still providing the same or generally similar functionality. The services and attributes of the production object 82 are discussed further with respect to FIGS. 3–4 below.

Figure 3:
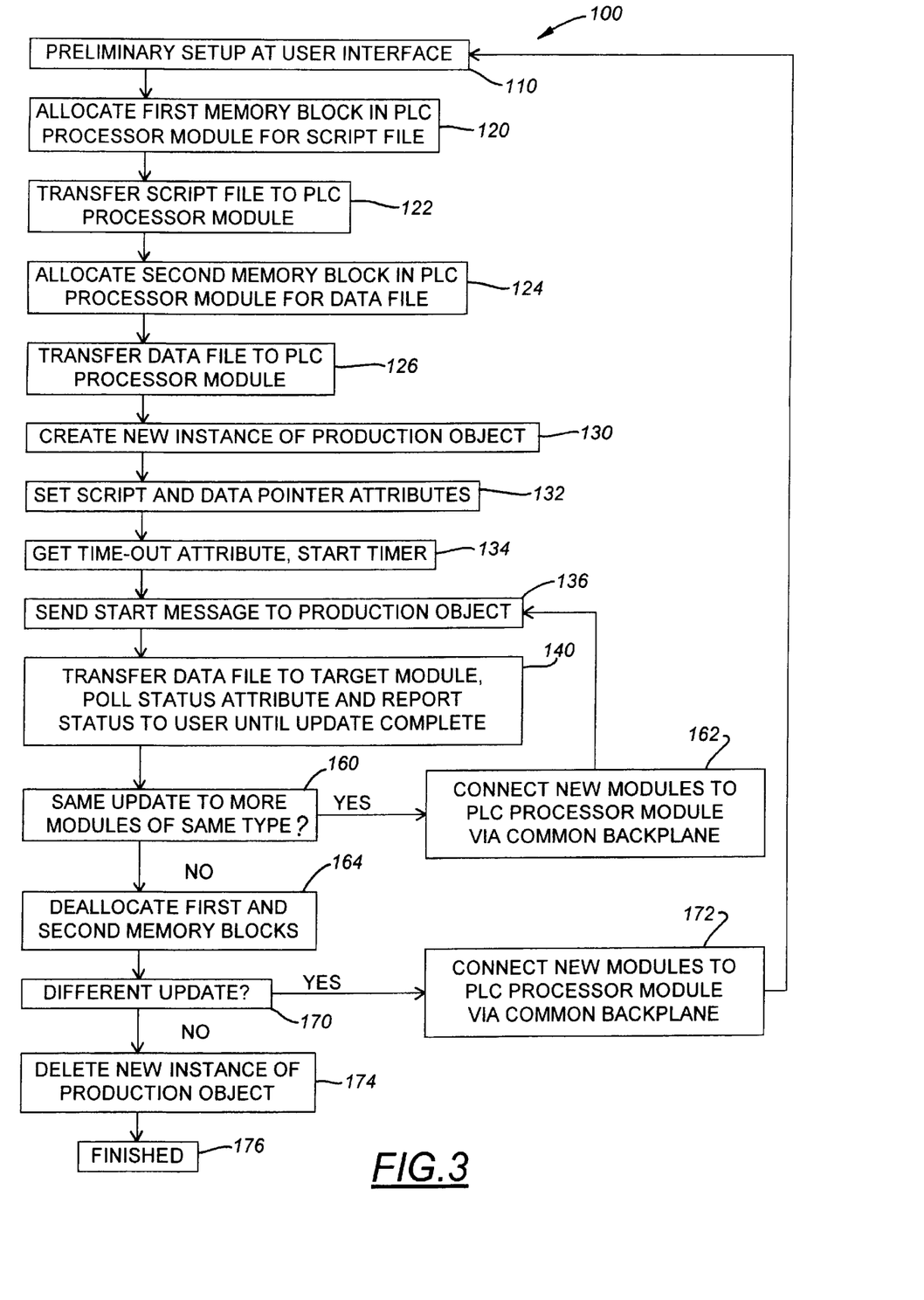
FIG. 3 illustrates a programming process in accordance with the present invention.
Figure 4:
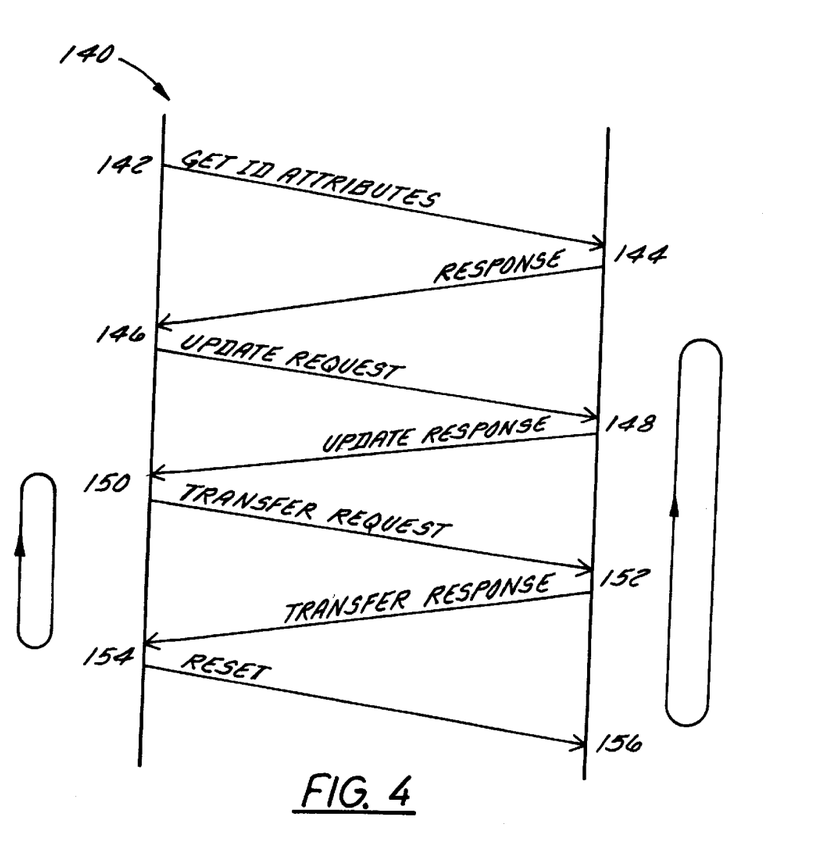
FIG. 4 illustrates in greater detail the step of transferring the firmware update from a PLC processor module to a target module in the programming process illustrated in FIG. 3, in accordance with the present invention.

Referring now to FIGS. 3–4, a process 100 used for updating the target module 42 in accordance with the present invention is illustrated.

By way of overview, the process 100 can be broken down into three major parts. First, in steps 110–134, the user interface 21 performs (or at least initiates) various set-up operations at the user interface 21 itself and at PLC processor module 32. Included among the set-up operations is the transferring of the firmware revision to the production object 82. Second, in steps 136–140, the production object 82 is invoked and the firmware revision is transferred to the target module 42. During this time, control is passed to the production object 82, which then transfers the firmware revision to the target module 42 in step 140 (illustrated in detail in FIG. 4). Finally, in steps 160–176, control is returned to the user interface 21, which then determines if additional updates should be performed and, if so, initiates the additional updates.

More specifically, the process 100 starts at step 110 where various preliminary set up operations occur. For example, assuming the process 100 is being used to perform updates in the field, the user must take PLC system 30 off line. In either case, the user must also select a particular script file from the firmware library 23 corresponding to the firmware revision that the user wishes to load into the target module 42. If the script and data files are not already in the firmware library 23, the user must load them via floppy disk or via the network.

Once the user selects a script file, the production object 82 verifies the script format, displays the script file to the user, and displays the status of script format verification to the user. The production object 82 also verifies that the data file(s) contained in the script file are accessible, and displays the status of the data file verification to the user.

The process 100 then proceeds to steps 120–126, where the script and data files are transferred from the PC 20 to the PLC processor module 32. Specifically, at step 120, the user interface 21 first invokes the memory object 84 to allocate a first memory block in the PLC processor module 32.

The memory object 84 is responsible for managing the memory of the PLC processor module 32. As such, the memory object includes the services ALLOCATE, DEALLOCATE, WRITE and READ. Further, as discussed above, the services of objects in an object-oriented system are accessed through a message-based interface. The messaging occurs in two parts: a request message and a response message. Thus, in order to invoke the memory object 84 to allocate a first memory block in the PLC processor module 32, the user interface 21 sends an ALLOCATE request message to the memory object 84. The parameters of the ALLOCATE request message include the size of the memory block requested, which in this case corresponds to the size of the script file. The memory object 84 then responds with an ALLOCATE response message, which confirms that the ALLOCATE request has been granted and advises the user interface 21 of the starting address of the first allocated memory block.

At step 122, the script file is transferred from the PC 20 to the PLC processor module 32 by way of the RS-232 link 50. The script file is written into the first memory block using the WRITE service of the memory object 84. The status of the script file transfer is preferably displayed to the user.

At step 124, the user interface 21 invokes the memory object 84 to allocate a second memory block in the PLC processor module 32. Again, the user interface 21 sends an ALLOCATE request message which indicates the size of the memory block requested to the memory object 84. In this case, the size of the second memory block corresponds to the total size of all of the data files for all of the updates to be performed. (For example, if the script file contains three updates, then the size of the memory block requested corresponds to the total size of the three data files for the three updates in the script file. For simplicity, it will initially be assumed that the script file contains only one update.) Again, the memory object 84 then responds with an ALLOCATE response message, which confirms that the ALLOCATE request has been granted and advises the user interface 21 of the starting address of the second allocated memory block.

At step 126, the data file is transferred from the PC 20 to the PLC processor module 32 by way of the RS-232 link 50, and written to the RAM 72 using the WRITE service of the memory object 84. The status of the data file transfer is preferably displayed to the user.

At step 130, the user interface 21 sends a CREATE request message to the production object 82 to create a new instance of the production object 82. The CREATE and DELETE services are used for creating and deleting an instance of the production object. Although the production object 82 is continuously resident on the PLC processor module 32, a new instance of the production object is created each time the production object 82 is used.

In essence, the creation of a new instance of the production object 82 simply means that resources of the PLC processor module 32 are allocated to the production object 82. Primarily, the allocated resources are memory resources of the PLC processor module 32. The creation and deletion of new instances of the production object 82 in this manner minimizes the resources occupied by the production object 82 when (as is normally the case) the production object 82 is not in use.

At step 132, the user interface 21 sends a SET ATTRIBUTE request message to the production object 82 in order to set the SCRIPT POINTER attribute and the DATA POINTER attribute. The SCRIPT POINTER and the DATA POINTER attributes are set to the starting addresses of the first and second memory blocks, respectively.

Notably, rather than pointing to the RAM 72, the DATA POINTER could instead point to the location of the PLC processor module's own firmware in the non-volatile memory 70. This could be done if the PLC processor module 32 has itself been updated and the user simply wishes to update one or more other PLC processor/target modules in the same manner. Advantageously, the ability to "clone" the PLC processor module 32 in this manner avoids the need to transfer a data file to the RAM 72 at step 126 (the most time consuming part of the process 100). Of course, a script file is still needed when cloning occurs, because the production object 82 still needs to know how the firmware revision should be performed.

At step 134, the user interface 21 initiates a timer which allows the update to be aborted if a fault occurs causing a maximum allowable update time to be exceeded. To establish the timer, the user interface 21 sends a GET ATTRIBUTE request message to the production object 82 in order to request the TIME-OUT attribute at step 134, and initiates the timer based on the TIME-OUT attribute. As noted above, the TIME-OUT attribute defines the maximum allowable time for the STATUS attribute to return to idle before a time-out error occurs.

At step 136, the user interface 21 sends a START request message to the production object 82. Upon reception of the START request message, the production object reads the script file at the SCRIPT POINTER location, and then interprets the script to determine how to perform the update. The START request message also causes the production object 82 to initiate communication with the target module 42 and begin transferring the firmware update to the target module 42.

At step 140, the production object 82 transfers the firmware update to the target module 42. Step 140 is illustrated in greater detail in FIG. 4. Referring now to FIG. 4, the sequence of messages between the production object 82 (left-hand side) the target module 42 (right-hand side) is illustrated.

At step 142, the production object 82 transmits a GET ATTRIBUTE request message to a device object 93 of the target module 42 (see FIG. 2), and at step 144 the device object 93 responds with a GET ATTRIBUTE response message containing the requested information. The device object 93 has attributes which store identification information regarding the target module 42 (e.g., serial number, hardware revision, catalog number, software revision, and/or other information). Thus, the GET ATTRIBUTE service of the device object 93 is used by the production object 82 to access the identification information and verify that the correct type of module is being updated. (The GET ATTRIBUTE service of the device object 93 is similar to the GET ATTRIBUTE service of the production object 82, except that it is used to get the attributes of the device object 93 and not the production object 82.)

At step 146, the production object 82 transmits an UPDATE request message to an NVS (non-volatile storage) object 95 of the target module 42 (see FIG. 2B). The NVS object 95 handles performing updates to the non-volatile memory 90. The UPDATE service is one of the services offered by the NVS object 95, and is used simply to inform the NVS object 95 that an update is requested. (As detailed below, the NVS object 95 also offers a TRANSFER service which is used to transfer data to the target module 42.) The parameters of the UPDATE request message include the starting address and size of the update.

At step 148, the target module 42 responds to the UPDATE request message with an UPDATE response message. The parameters of the UPDATE response message include the maximum allowable size for individual transfers of data. The transfer size must be less than or equal to the connection size defined by the backplane 54 (e.g., 128 bytes). At this time, the target module 42 stops all of its other activities and does not initiate any new activities until the update is complete.

At step 150, the production object 82 receives the UPDATE response message and sends a TRANSFER request message. The transfer service of the NVS object 95 is used to transfer data (i.e., the firmware update itself) to the target module 42. The parameters of the TRANSFER request message are a transfer number and the data. Initially, the transfer number represents an offset from a base address in the volatile memory 92 of the target module 42. Then, with each repetition of step 150, the transfer number is incremented by the number of bytes transferred.

At step 152, the target module 42 responds to the TRANSFER request message with a TRANSFER response message. The parameters of the TRANSFER response message are the last transfer number received (which is the same parameter value as in the TRANSFER request message) and the status (which indicates the success or failure of the transfer).

Steps 150 and 152 are repeated until the update is complete. For example, if the size of the update is 600 kilobytes (FileSize=600 kilobytes=614400 bytes), and the transfer size is 128 bytes, then approximately 4800 iterations (614400÷128=4800) of steps 150–152 occur. (Note that, if multiple updates to the same target module are performed, then multiple iterations of the steps 146–156 occur, including multiple iterations of steps 150–152 within each iteration of steps 146–156.)

As the iterations of steps 150–152 occur, the user interface 21 periodically (e.g., once every 2.5 seconds) sends GET ATTRIBUTE request messages to the production object 82 to poll the status of the production object 82. The GET ATTRIBUTE request message is used to check the status of the update until one of the following status reports is received: "completed", "error", or "timed-out".

At step 156, after the data is successfully and completely transferred, and assuming the UpdateReset flag is set in the script file, the production object 82 transmits a RESET request message in order to reset the target module 42 and the "completed" status report is sent to the user interface 21.

If there are multiple target modules, then the production object 82 proceeds with transferring the first update to the other target modules. If a particular target module update is unsuccessful, the production object 82 ceases communication with that target module and attempts to update other modules until an update to the last slot in the backplane 54 has been attempted. Advantageously, it is not necessary for the production object 82 to perform another download over the (slow) RS-232 link 50 each time the first update is transferred to another module over the (high-speed) backplane 54.

If there are multiple target modules and multiple updates in the script file, then each update is first transferred to each of the other target modules before the production object 82 proceeds to the next update. Thus, the production object 82 first transfers the first update to all of the target modules, then transfers the second update to all of the target modules, and so on. This process continues automatically until all of the updates have been transferred to all of the target modules.

As noted above, a RESET request message is sent to the target module after each update is performed (assuming the UpdateReset flag is set). Since it takes a module about 10 seconds to reset, the fact that the production object 82 transfers each update to all of the target modules before proceeding to the next update gives the target modules time to reset after an update is complete.

After all of the updates have been performed to all of the modules in the backplane 54, the user interface permits the user to perform the same update to more modules of the same type as those that were just updated, to perform a different update to different modules than the type just updated, or to not perform any more updates.

Thus, at step 160, the user interface prompts the user whether the user wishes to perform the same update to more modules of the same type. If the user answers "YES" at step 160, then at step 162 the user inserts the additional target modules into the backplane 54 or, alternatively, removes the PLC processor module 32 from its current backplane and places it into a new backplane which is already loaded with the additional target modules. The process 100 then returns directly to 136, where another START request message is transmitted to the production object 82. Notably, steps 110–134 are skipped, since the production object 82 still has the required script and data files and is completely set up to update the additional modules. This is highly advantageous because, as previously noted, transferring the data file to the PLC processor module 32 (at skipped step 126) is the most time consuming part of the process 100.

If the user answers "NO" at step 160, then at step 164 the user interface 21 sends a DEALLOCATE request message to the memory object 84 to deallocate the first and second memory blocks. The fact that the user does not wish to perform the same update to more modules of the same type implies that the previously downloaded script and data files are no longer needed, and thus that the memory in which they are stored may be deallocated.

At step 170, the user interface prompts the user whether the user wishes to perform a different update. Strictly speaking, any update which requires different script and data files would constitute a different update. Generally, however, the different update would involve a different type of module. Thus, at step 172 the user inserts additional target modules into the backplane 54 or, alternatively, removes the PLC processor module 32 from its current backplane and places it into a new backplane which is already loaded with the additional target modules. Then, the process 100 starts over at step 110 and proceeds as previously described, except that a new instance of the production object 82 need not be created in step 130 (since the previous instance of the production object 82 was never deleted).

If the user answers "NO" at both steps 160 and 170, then no more updates are performed. Accordingly, at step 174, a DELETE request message is sent to the production object 82, which deletes the instance of the production object 82 and deallocates the resources that were allocated to the instance of the production object 82. The process 100 is thus complete.

Figure 5A:
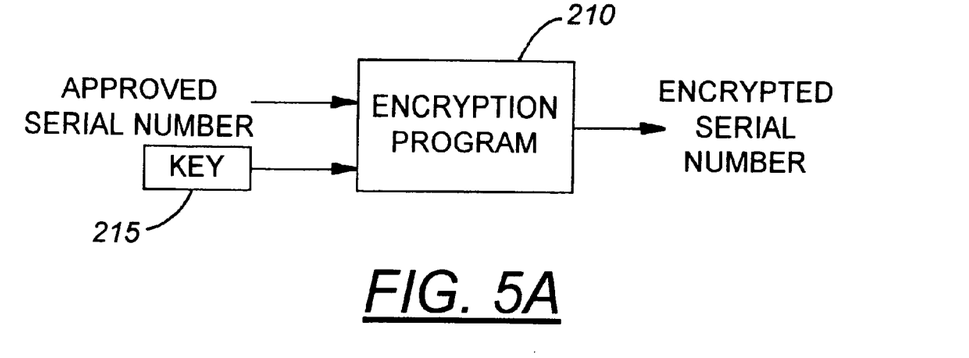
FIGS. 5A–5C illustrate an encryption/decryption system usable in conjunction with the system and process of FIGS. 1–4, in accordance with the present invention.
Figure 5B:
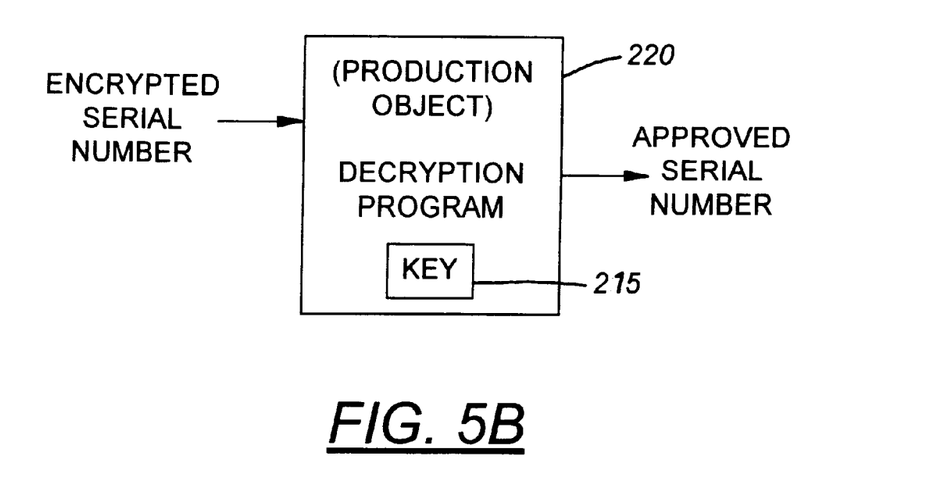
Figure 5C:
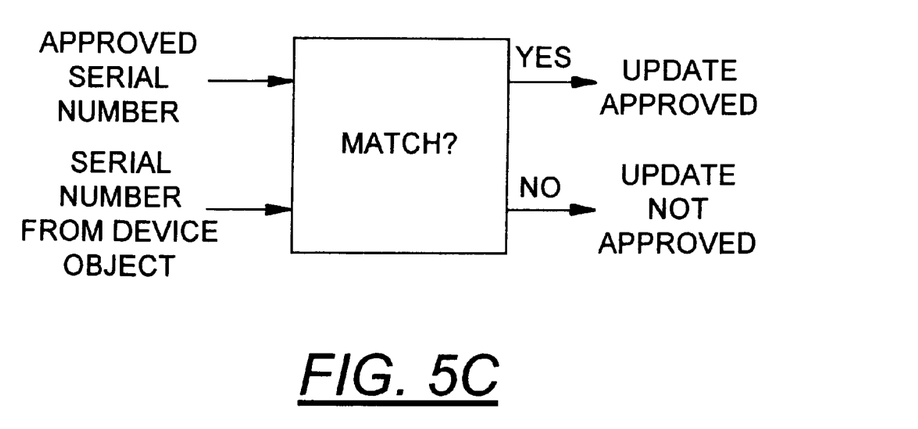

Referring now to FIGS. 5A–5C, an encryption/decryption system 200 usable in conjunction with the non-volatile memory programming system 10 and process 100 described in FIGS. 1–4. The purpose of the encryption/decryption system is to prevent unauthorized proliferation of proprietary firmware when field updates are performed.

The system 200 comprises an encryption program 210 and a decryption program 220. The encryption program 210 is in the possession of the firmware producer, and resides for example on a personal computer. The decryption program 220 is a part of the production object 82 and resides on the PLC processor module 32. The encryption program 210 and the decryption program 220 preferably utilize the same key 215 and preferably perform the inverse operations of each other (although a more complicated encryption/decryption scheme could be used).

When a customer wishes to have the firmware of a target module updated, the customer provides the firmware producer with the serial number of the target module. The serial number is unique to the target module and distinguishes the target module from every other individual module in the entire PLC product line. The firmware producer then uses the encryption program 210 to encrypt the "approved" serial number of the target module based on the encryption key 215. The encryption program 210 generates an encrypted serial number which is then downloaded to the PLC processor module 32 in the form of a security file. The security file is analogous to the script and data files except that it is used for downloading one or more encrypted serial numbers to the PLC processor module 32. The security file is downloaded to the PLC processor module 32 in generally the same manner as the script and data files. Thus, in the process 100, there is also a step in which a third memory block is allocated in the PLC processor module 32 for the security file, and the production object also includes a SECURITY POINTER attribute.

In the field, the firmware revision (including the security file) is downloaded to the production object 82 on the PLC processor module 32. The encrypted serial number is decrypted using the decryption program 220. Concurrently, the production object 82 accesses the device object of the target module using the GET ATTRIBUTE service (as previously described) in order to obtain the serial number of the target module. The production object 82 then compares the decrypted serial number that was downloaded with the firmware revision with the serial number obtained from the device object of the target module. (Of course, instead of decrypting the downloaded serial number, the production object 82 could encrypt the serial number received from the device object and then compare the two encrypted serial numbers.) The update is then performed only if there is a "match."

If updates to multiple modules are performed, then the serial numbers of each of the target modules are encrypted by the encryption program 210. The encrypted list of serial numbers is then downloaded in the security file to the production object 82, where the list is decrypted. When it is time to update a particular target module, the production object 82 then compares the serial number of the particular target module with the decrypted list of serial numbers. Again, the update is performed only if there is a "match." Thus, the encryption/decryption system of FIGS. 5A–5C provides a way of preventing a customer from transferring a firmware update to more than the approved number of target modules.

Advantageously, the preferred embodiment of the present invention provides a rapid way of programming modules having non-volatile memory. Unlike prior art systems, the programming tool is in the form of an embedded object and is located internally and not externally to the programmable controller system. As a result, it is possible to transfer the firmware program to the production object just once (e.g., over a serial link), and then the production object can transfer the firmware program to a virtually unlimited number of target modules over a high-speed network connection. Thus, it is no longer necessary to have a one-to-one correspondence between the number of modules updated and the number of downloads performed over a slow-speed communication link, and the amount of time required to program a plurality of modules is drastically reduced.

Further, the preferred embodiment of the present invention is usable both during production and in the field. It is not necessary to have two different systems for programming modules depending on when the programming takes place. Thus, the preferred embodiment of the present invention is able to drastically reduce programming time without requiring different systems for programming during production and in the field.

Moreover, the preferred embodiment of the present invention minimizes the downtime of modules when updating occurs, even when only a single module is updated. The target module does not need to be plugged into the backplane until after the firmware program is transferred to an intermediate module (e.g., in the illustrated example, the PLC processor module 32) over the serial link. During this transfer, the target module can still be used for controlling industrial processes. Thus, the only truly required downtime is the nominal amount of time that it takes to plug the target module into the backplane and transfer the firmware update to the target module over the backplane, which is preferably a high seed backplane.

Finally, the preferred embodiment of the present invention provides a single tool which can be used to program a plurality of different modules, regardless of the types of communication ports disposed on the fronts of the modules. The firmware update can always be first communicated to a single type of module, and then transferred to any type of target module so long as the target module is disposed on the common backplane. Therefore, it is no longer necessary to have a separate programming tool for each module having a different type of communication port.

Many other changes and modifications may be made to the present invention without departing from the spirit thereof. The scope of these and other changes will become apparent from the appended claims.

What is claimed is:

1. A production object for an object-oriented programming language, said production object being disposed in a first module, and said production object comprising:
    a plurality of services and a plurality of attributes which are adapted for transferring an executable program from the first module to a second module over a common network;
    wherein said plurality of services include a first service that is capable of creating a new instance of said production object to transfer the executable program from the first module to the second module; and
    wherein said plurality of services include a second service that is capable of setting at least one of the plurality of attributes, said at least one attribute defining a parameter pertaining to the transfer of the executable program from the first module to the second module.

2. The production object according to claim 1, wherein said production object is further adapted for transferring the program from the first module to a plurality of additional modules over the common network.

3. The production object according to claim 1, wherein the program is contained in a data file, wherein a script file defines parameters for transferring the program to the second module, and wherein said plurality of attributes includes
    a script pointer attribute, said script pointer attribute pointing to a first location in a memory of the first module where the script file is stored; and
    a data pointer attribute, said data pointer attribute pointing to a second location in the memory of the first module where the data file is stored.

4. The production object according to claim 3, wherein said plurality of services includes
    a delete service, said delete service being adapted for deleting said new instance of said production object after the program is transferred;
    and wherein resources of the first module are allocated and deallocated when said new instance is created and deleted, respectively.

5. The Production Object according to claim 1, wherein said executable program implements at least a portion of an operating system for said second module.

6. The Production Object according to claim 1, wherein said common network comprises a common backplane of said first and second modules.

7. The production object according to claim 1, wherein said executable program implements at least a portion of an operating system for said second module.

8. A method of transferring a firmware program to a plurality of target modules in a programmable controller system, said programmable controller system being programmable with an object-oriented programming language, the method comprising the steps of:
    A. transferring said firmware program from a user interface to a first module, said first module being a programmable controller module; and
    B. transferring said firmware program from said first module to said plurality of target modules over a common backplane, said plurality of target modules being programmable controller modules, said plurality of target modules and said first module being commonly disposed in said common backplane, said transferring step (B) including the steps of
        1. invoking a production object which is disposed in said first module, said production object being part of said object-oriented programming language, and said production object having a plurality of services and a plurality of attributes which are adapted for transferring said firmware program from said first module to said plurality of target modules, and
        2. using said production object to transfer said firmware program from said first module to said plurality of target modules.

9. The method according to claim 8, further comprising the steps of
    1. removing said first module from said common backplane; then
    2. placing said first module in a different common backplane having a different plurality of target modules disposed therein, said different plurality of target modules being programmable controller modules; and then
    3. transferring said firmware program from said first module to said different plurality of target modules over said different common backplane, said transferring step (3) being performed by said production object.

10. The method according to claim 8, further comprising the steps of
    1. removing said plurality of target modules from said common backplane; then
    2. placing a different plurality of target modules in said common backplane, said different plurality of target modules being programmable controller modules; and then
    3. transferring said firmware program from said first module to said different plurality of target modules over said common backplane, said transferring step (3) being performed by said production object.

11. The method according to claim 8, wherein said first module is a programmable controller processor module.

12. The method according to claim 8, wherein said firmware program is contained in a data file, wherein a script file defines parameters for transferring said firmware program, and further comprising the steps of
    setting a script pointer attribute, said script pointer attribute pointing to a first location in a memory of said first module where said script file is stored; and
    setting a data pointer attribute, said data pointer attribute pointing to a second location in said memory of said first module where said data file is stored.

13. The method according to claim 8, wherein said firmware program is a firmware program for said first module, and further comprising the steps of
    setting a script pointer attribute, said script pointer attribute pointing to a first location in a memory of said first module where a script file is stored, said script file defining parameters for transferring said firmware program;
    cloning said first module, said cloning step including the step of setting a data pointer attribute, said data pointer attribute pointing to a second location in said memory of said first module where said firmware program is stored.

14. A method of transferring a firmware program to a plurality of target modules, the method comprising the steps of:
    A. providing a programmable controller system comprising a first module and said plurality of target modules, said programmable controller system being programmable with an object-oriented programming language, and said first module and said plurality of target modules being commonly disposed in a common backplane;

B. sending a first allocate request message to a memory object in said first module, said memory object having a plurality of services and a plurality of attributes which are adapted for managing memory of said first module;

C. allocating a first memory block in said memory of said first module, said allocating step (C) being performed by said memory object in response to said sending step (B);

D. transferring a script file from a user interface to said first memory block, said script file defining parameters for transferring said firmware program to said plurality of target modules;

E. sending a second allocate request message to said memory object in said first module;

F. allocating a second memory block in said memory of said first module, said allocating step (F) being performed by said memory object in response to said sending step (E);

G. transferring a data file from said user interface to said second memory block, said data file containing said firmware program;

H. sending a create request message to a production object, said production object having a plurality of services and a plurality of attributes which are adapted for transferring said firmware program from said first module to said plurality of target modules, said production object being disposed in said first module, said create request message causing a new instance of said production object to be created for transferring said firmware program to said plurality of target modules;

I. setting a script pointer attribute, said script pointer attribute pointing to said first memory block, and said script pointer attribute being one of said plurality of attributes of said production object;

J. setting a data pointer attribute, said data pointer attribute pointing to said second memory block, and said data pointer attribute being one of said plurality of attributes of said production object;

K. invoking said production object; and

L. transferring said firmware program from said first module to said plurality of target modules over said common backplane, and said transferring step (L) being performed by said production object.

15. The method according to claim 14, further comprising the steps of encrypting information which identifies said plurality of target modules, transferring said encryped information to said first module, and decrypting said encrypted information at said first module, and wherein said transferring step (L) is performed only after verifying that said information matches information previously stored in each of said plurality of target modules.

16. The method according to claim 15, further comprising the steps of:

A. sending a third allocate request message to said memory object in said first module;

B. allocating a third memory block in said memory of said first module, said allocating step (B) being performed by said memory object in response to said sending step (A);

C. transferring a security file from said user interface to said third memory block, said security file containing said encrypted information; and D. setting a security pointer attribute, said security pointer attribute pointing to said third memory block, and said security pointer attribute being one of said plurality of attributes of said production object.

17. A method of transferring a firmware program to a plurality of target modules, the method comprising the steps of:

A. providing a programmable controller system comprising a first module and said plurality of target modules, said programmable controller system being programmable with an object-oriented programming language, and said first module and said plurality of target modules being commonly disposed in a common backplane;

B. sending an allocate request message to a memory object in said first module, said memory object having a plurality of services and a plurality of attributes which are adapted for managing memory of said first module;

C. allocating a memory block in said memory of said first module, said allocating step (C) being performed by said memory object in response to said sending step (B);

D. transferring said firmware program from a user interface to said memory block;

E. sending a create request message to a production object, said production object having a plurality of services and a plurality of attributes which are adapted for transferring said firmware program from said first module to said plurality of target modules, said production object being disposed in said first module, said create request message causing a new instance of said production object to be created for transferring said firmware program to said plurality of target modules;

F. invoking said production object; and

G. transferring said firmware program from said first module to said plurality of target modules over said common backplane, and said transferring step (G) being performed by said production object.

* * * * *